July 5, 1932.  W. R. TARTE  1,865,801

OSCILLATIVE AUTOMOBILE BUMPER

Filed April 15, 1931

INVENTOR,
Whitfield R. Tarte.
BY David E. Lain,
ATTORNEY.

Patented July 5, 1932

1,865,801

UNITED STATES PATENT OFFICE

WHITEFIELD R. TARTE, OF BELLINGHAM, WASHINGTON

OSCILLATIVE AUTOMOBILE BUMPER

Application filed April 15, 1931. Serial No. 530,243.

My invention relates to improvements in vehicle bumpers, more especially when used on automobiles, and has for an object to provide a car bumper the ends of which are suited for extending beyond the wheel-guard ends to fend the entire width of the car including said wheel guards.

Another object of my improvement is to provide a car bumper with oscillative ends which extend beyond the ends of the wheel guards to fend the same and move out of engagement with passing cars when caught thereby.

Another object of my improvement is to provide a bumper frame suitable to fend the car ends and also adapted for mounting said oscillative bumper ends thereon.

Other objects of my improvement will appear as the description proceeds.

Figure 1:
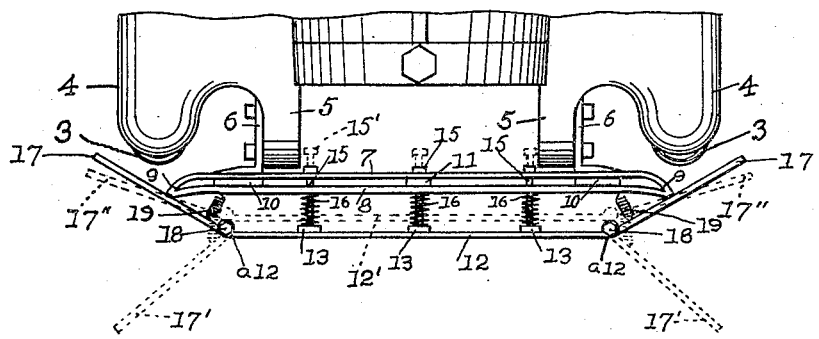
Figure 2:
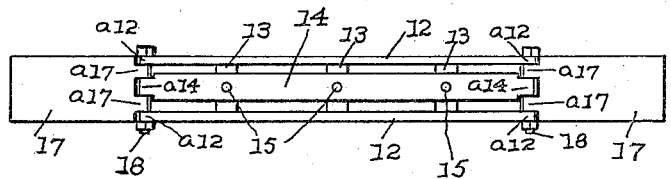

I attain these and other objects of my improvement with the mechanism illustrated in the accompanying sheet of drawings, forming a part of this specification, in which Figure 1 is a plan view of the front end of an automobile with my bumper in place thereon and Fig. 2 is a front elevation of the bumper disconnected from the car.

Similar characters represent similar parts throughout.

With more particular reference to the designated parts: A portion only of the front end of an automobile is shown in plan view in Fig. 1, the remainder thereof being broken away, in which the front parts of the front wheels are shown at 3, 3, the front parts of the wheel guards at 4, 4 and the front ends of the front spring housings at 5, 5.

Brackets 6, 6 are fastened to spring housings 5, 5 and extend forward thereof where they are fastened to bumper frame bar 7. Bumper frame bar 8 is preferably parallel with frame bar 7 and is fastened thereto by bridge blocks 10, 10 and 11, providing an intervening space and also it has its ends fastened together and bent forward at 9, 9.

The central front part of the bumper consists of upper bar 12, bottom bar 12 similar thereto and central bar 14. These three bars preferably are parallel and joined by cross bars 13, 13 and 13, providing a grid which is shorter than the width of the car having eyes in the ends thereof at $a12$, $a12$, $a12$, $a12$, $a14$ and $a14$, three of which register with each other at the ends of the grid.

Frame beam 7, 8 has three openings therethrough through which are extended three bolts 15, 15, 15 from the rear forward thereof to enter openings in line therewith through cross bars 13, 13, 13 and central front bar 14 in which they are fastened to dispose said bolts 15 in parallel relation and provide for the flatwise reciprocation of front grid 12, 12, 14 on said bolts in said openings through the frame beam 7, 8. On each of bolts 15 is mounted a coiled spring 16 to react between said frame beam and said front grid maintaining the front grid in its foremost position with the heads of bolts 15 bearing on the rear of beam bar 7; but pressure on the front grid toward the rear may be sufficient to overcome the resistance of springs 16 and move the grid backward, as to its dotted position at 12', and said bolts to their dotted positions at 15'. However, the release of the grid from said pressure will allow said springs to react and move said grid and bolts to their full-line positions.

Two oscillative ends 17, 17 are provided for the bumper, each having two eyes $a17$, $a17$ in one end thereof disposed to match between eyes $a1$ and $a14$, and between eyes $a14$ and $a12$ on the grid, respectively, with the openings therein aligned with each other and with the openings in said eyes $a12$, $a14$ and $a12$ through which is extended a hinge bolt 18 on each end of the grid to join said ends 17, 17 therewith in hinge relation mounting said ends on the grid for oscillation.

The ends 9, 9 of the frame beam are disposed relative to the hinge mountings of ends 17, 17 to dispose said bumper ends at the desired angularity with said grid thereof when the oscillative ends bear on the said beam ends, as shown in Fig. 1 where said angularity is sufficient to deflect sidewise away from said bumper a car colliding with one of bumper ends 17. Also, since the extreme ends of bumper ends 17, 17 are extended beyond the ends of wheel guards 4, 4, a car passing close enough to contact with one of said wheel guards, if the usual shorter bumper were used, also would contact with the outer end of one of oscillative bumper ends 17 and be deflected away from said guard 4.

Bumper ends 17, 17 are retained in operative position bearing on beam ends 9, 9 by coil springs 19, 19 fastened to frame beam 8 and to bumper ends 17 used under tension. When the bumper grid is moved to its dotted position at 12' springs 19 tend to retain the bumper ends at 17'', 17'', bearing on beam ends 9, 9. The same is true for all of the reciprocative positions which said grid may occupy, that is, springs 19 tend at all times to cause bumper ends 17 to bear on beam ends 9.

When the car is being passed by another so close that the free ends of either of oscillative bumper ends 17 is engaged thereby to move it off of beam end 9 against the resistance of spring 19 then it may turn on hinge bolt 18 till it occupies a position forward far enough to become disengaged from said other car, as at 17', when the reaction of spring 19 will return it to its full-line position bearing against beam end 9. Thus the freedom of the bumper ends 17 to turn forward on their hinges makes destructive engagement with my bumper impossible when under similar conditions the ordinary form of automobile bumper would be injured.

Although the disclosure of my invention has been confined to a bumper ordinarily used on the front end of cars only, it is easily understood that the oscillative bumper ends are suitable for hanging on rear bumpers also and thus provide the same protection and freedom from injury as above referred to in connection with their use on the front bumper.

Having thus disclosed my invention, what I claim as new therein and desire to secure by Letters Patent is,—

An automobile bumper including a bumper frame beam having ends disposed to stop oscillative bumper ends in operative positions, means to fasten said beam to said automobile, a central member of said bumper shorter than the width of said automobile, means to mount said central member on said beam for limited lateral reciprocation, springs between said beam and said central member reacting to separate the same, bearings on the ends of said central member having substantially vertical axes, said oscillative bumper ends mounted on said bearings for oscillation, and springs connected to said bumper reacting to return said bumper ends in oscillation to bear on said beam ends.

WHITEFIELD R. TARTE.